(12) United States Patent
Chappell

(10) Patent No.: US 6,457,601 B1
(45) Date of Patent: Oct. 1, 2002

(54) DUTCH OVEN LINER

(76) Inventor: Craig Chappell, 348 E. 1450 South, Orem, UT (US) 84058

( * ) Notice: Subject to any disclaimer, the term of this patent is extended or adjusted under 35 U.S.C. 154(b) by 0 days.

(21) Appl. No.: 10/042,651

(22) Filed: Jan. 8, 2002

(51) Int. Cl.[7] .............................................. A65D 1/34
(52) U.S. Cl. ............................ 220/573.4; 220/573.1; 220/574.3; 220/495.03
(58) Field of Search ...................... 220/573.4, 573.1, 220/574.3, 495.03, 239

(56) References Cited

U.S. PATENT DOCUMENTS

| | | | | |
|---|---|---|---|---|
| 1,698,914 A | * | 1/1929 | Kircher | 220/573.4 X |
| 4,604,989 A | * | 8/1986 | Kita | 220/573.4 X |
| 4,828,134 A | * | 5/1989 | Ferlanti | 220/573.1 |
| 5,251,542 A | * | 10/1993 | Itoh et al. | 220/573.1 |
| 6,092,520 A | * | 7/2000 | Hasegawa | 220/573.1 X |
| 6,305,272 B1 | * | 10/2001 | Lin | 220/573.1 X |
| 6,313,446 B1 | * | 11/2001 | Jones | 220/573.1 X |

* cited by examiner

Primary Examiner—Steven Pollard
(74) Attorney, Agent, or Firm—Kirton & McConkie; Christopher L. Johnson

(57) ABSTRACT

The present invention features a disposable, recyclable Dutch oven liner designed to simplify cooking with and cleaning a Dutch oven. Specifically, the Dutch oven liner of the present invention advantageously provides for a desirable cooking environment, allows easy removal of food, and provides simplified clean-up. The Dutch oven liner virtually eliminates the undesirable problems traditionally associated with cooking with and cleaning a Dutch oven. The liner is sized and dimensioned to fit various Dutch ovens and is placed within the Dutch oven prior to the addition of food. The liner is preferably comprised of a leak proof aluminum material possessing sufficient strength factors that enable it to be durable enough to withstand rigorous food preparation, handling, and cooking conditions. Once the food item is done cooking the liner can be pulled from the oven and thrown away or recycled.

7 Claims, 3 Drawing Sheets

DUTCH OVEN LINER

BACKGROUND

1. Field of the Invention

The present invention relates to cooking pans, and particularly to a Dutch oven cooking vessel featuring a liner capable of fitting within the interior of the Dutch oven cooking vessel to provide an improved cooking environment and to simplify cooking with the Dutch oven cooking vessel, as well as the clean-up process.

2. Background

A Dutch oven is a outdoor cooking vessel that can be used in the cooking of many kinds of foods, from roasts to desserts. Many of the food products that are cooked in a Dutch offer a unique and great tasting alternative to conventional cooking. However, cooking with Dutch ovens requires a great deal of patience and effort as the preparation and cleanup involved can be extremely unpleasant.

A Dutch oven is typically a large and heavy cast iron vessel capable of enduring harsh environmental conditions, such as those experienced when camping. A Dutch oven is usually placed directly adjacent and in contact with a heat source for cooking, such as atop coals from a fire or charcoal briquettes or having such placed upon the lid of the Dutch oven for more even temperature control. However, it is very difficult to achieve and regulate uniform temperature control due to the nature of the heat source. During the cooking process, the outer surfaces of the Dutch oven in contact with the heat source become extremely hot. As heat dissipates through from the outside to the inside of the Dutch oven, the food closest to the inner surfaces often burns and becomes caked to the inside surfaces of the Dutch oven. Food that has been burnt is very difficult to scrape off, thus requiring a great deal of effort to clean. In addition, since it is rather difficult to achieve and to regulate the cooking temperature in the interior of the Dutch oven, and since the food is not protected from the hot inner sides, the burning of food is more common than not.

To add to the difficulty, Dutch ovens are typically used in a camping setting where modern conveniences are few, if available at all. Thus, those tasks, such as cleaning, that are often simplified by modem technology, require a more traditional and old fashioned approach, which in the case of cleaning a Dutch oven, is scrubbing and cleaning by hand food that is charred and caked to a cast iron surface. When out camping it is always more difficult to accomplish what would otherwise be simple tasks.

SUMMARY AND OBJECTS OF THE INVENTION

Until now, cooking with and cleaning Dutch ovens has largely been according to that described above and has been rather time consuming, messy, and unpleasant because of these shortfalls, notwithstanding the novelty of and fun that can be achieved cooking with a Dutch oven. In light of this, the present invention seeks to remedy the many unpleasantries often experienced with cooking with a Dutch oven.

Therefore, it is an object of a preferred embodiment of the present invention to provide a Dutch oven liner capable of separating the food from the inside surfaces of the Dutch oven.

It is another object of a preferred embodiment of the present invention to provide a Dutch oven liner fittable within a Dutch oven that allows for the preparation of foods in various ways.

It is another object of a preferred embodiment of the present invention to provide a Dutch oven liner that simplifies the cooking and cleaning processes associated with cooking with a Dutch oven.

It is a further object of a preferred embodiment of the present invention to provide a Dutch oven liner that is disposable, light weight, and durable.

To achieve the foregoing objects, and in accordance with the invention as embodied and broadly described herein, the present invention features a Dutch oven liner comprising a substantially upright wall forming a closed perimeter, wherein the upright wall has an upper and lower portion, and an inner and outer surface; and a bottom portion formed to the lower portion to create a cooking area capable of holding and allowing food to be cooked therein. The Dutch oven liner is similar in dimension to and capable of removably fitting within an interior portion of a Dutch oven cooking vessel, thereby simplifying the cooking and cleaning process associated with cooking with the Dutch oven cooking vessel. In a preferred embodiment, the Dutch oven liner comprises an aluminum makeup, and is both collapsible and disposable.

The Dutch oven liner further comprises means for handling and carrying said Dutch oven liner so that the liner may be easily removed after the expiration of the cooking time. The handles allow the user to grasp the liner, separate from the Dutch oven cooking vessel, and remove the liner (and the food therein) without having to move the Dutch oven cooking vessel. In a preferred embodiment, means for handling and carrying comprises at least one handle integrally formed with or coupled to said upper portion of said Dutch oven liner, wherein the handle(s) is/are flexible and able to fold down out of the way during cooking.

The present invention further features a Dutch oven cooking system comprising a Dutch oven cooking vessel having an interior therein; a lid that is fittable with the Dutch oven cooking vessel; and a Dutch oven liner similar in size and dimension to the interior portion of the Dutch oven cooking vessel, wherein the Dutch oven liner is capable of removably fitting within the interior of the Dutch oven cooking vessel and allowing the replacement of the lid onto the Dutch oven cooking vessel to provide an improved cooking environment. The Dutch oven liner is intended to simplify and increases the efficiency of cooking with and cleaning the Dutch oven cooking vessel as food contained within the Dutch oven liner is sufficiently cooked due to a heat transferring relationship between the Dutch oven liner and the Dutch oven cooking vessel, and wherein the Dutch oven liner provides for quick and efficient cleaning of the Dutch oven by simply removing the Dutch oven liner.

Cooking with the Dutch oven liner of the present invention provides many advantages, including providing safer, cleaner, and more efficient cooking when doing so with a Dutch oven cooking vessel. The liner is easily inserted into the interior portion of the Dutch oven cooking vessel prior to cooking and then allows the user to remove the liner once cooking is completed without having to move the actual Dutch oven vessel. Cleanup is greatly simplified as the liners are disposable, allowing the user to simply discard the liner when finished leaving the interior of the Dutch oven cooking vessel free from food product. In addition, no food comes in contact with the actual vessel, thus there is no cleanup of any surface foods within the Dutch oven vessel.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 5, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

The present invention describes a Dutch oven liner and Dutch oven cooking system and device as described above.

Figure 1:
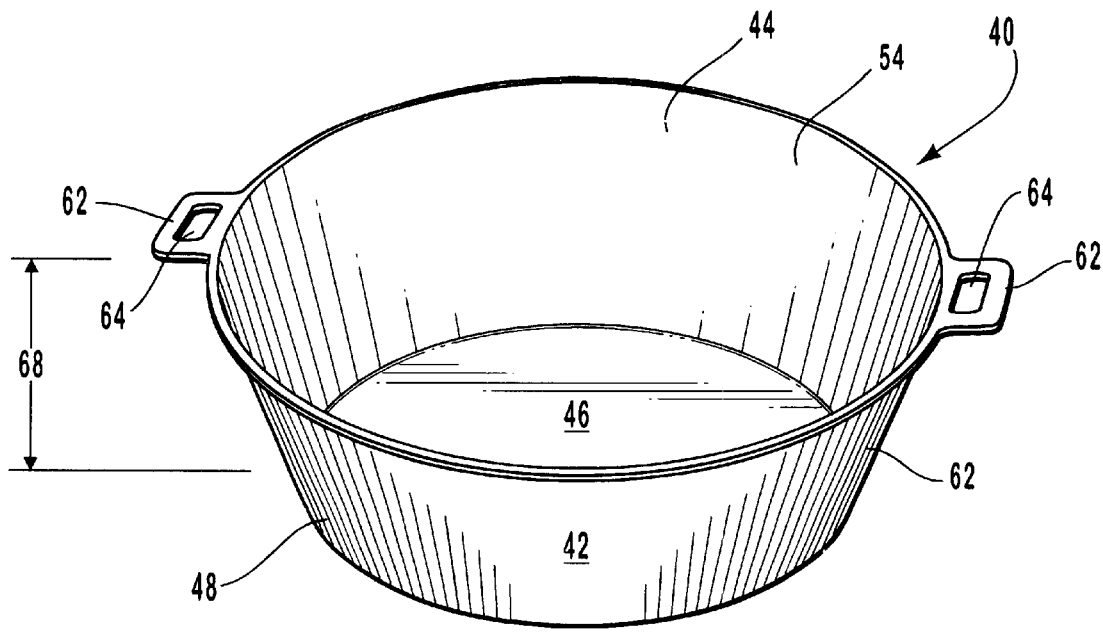
FIG. 1 illustrates a perspective view of the Dutch oven liner and associated handles in an outward, carry-ready position.

Specifically, FIG. 1 illustrates one, a preferred, embodiment of the Dutch oven liner of the present invention that is designed to be used in cooking with a Dutch oven cooking vessel. Dutch oven liner 40 is shown having a side wall 42 that is substantially vertical or upright and forms a cylindrical perimeter around and extending from bottom portion 46. Side wall 42 includes an upper portion 44 and a lower portion 48 and an outside surface 50 and an inner surface 54. As stated, side wall 42 is formed with and extends from bottom portion 46 to form a closed perimeter around bottom 46, wherein a cooking area capable of holding and allowing food to be cooked therein is created. Cooking area is shown in FIG. 1 as cooking interior 58.

Dutch oven liner 40 is preferably made of a medium weight aluminum, so as to be durable enough to withstand the potentially harsh conditions often experienced with cooking with a Dutch oven, yet easily disposed of or recycled when finished cooking with and/or serving from Dutch oven liner 40. Indeed, it is intended that Dutch oven liner 40 be durable enough so that food may be prepared in Dutch oven liner 40 prior to being inserted into a Dutch oven vessel. This provides a significant advantage as it is much easier to manipulate and carry Dutch oven liner 40 than the Dutch oven cooking vessel. In addition, the durability of Dutch oven liner 40 will be such that it will not be easily punctured by the user during preparation of the food or cooking, such as by stirring, etc., thus providing a leak proof and effective cooking device. The aluminum makeup also contributes to the ability of Dutch oven liner 40 to receive heat transferred from a Dutch oven cooking vessel.

Dutch oven liner 40 is shown having a certain shape and dimension. It is intended that Dutch oven liner 40 be of suitable size and shape so as to be fittable, or removably fittable, within the interior of a Dutch oven cooking vessel. It should be noted that Dutch oven cooking vessels are available in a variety of various sizes and shapes depending upon the needs and desires of a user. The present invention Dutch oven liner is easily constructed so as to comprise any shape and dimension in accordance with these various shaped and sized Dutch oven cooking vessels.

Finally, one of the major advantages to cooking with Dutch oven liner 40 is its ability to almost eliminate the cleanup process. Often, cooking with Dutch ovens can mean a quite involved cleanup process as described above. This is largely due to the conditions under which food is cooked and the material makeup of Dutch oven cooking vessels. Utilizing Dutch oven liner 40 eliminates most of the hassle often associated with cleanup as one simply discards Dutch oven liner 40 when finished. There is no need to clean the liner as a new one is simply used in its place for the next meal. Dutch oven liner 40 is designed to eliminate spills and leaks from entering within the actual Dutch oven cooking vessel, thus this vessel may be used without ever being exposed to food products that are typically very difficult to clean and remove from the surfaces of the vessel. Moreover, because the size and shape of Dutch oven liner 40 is virtually identical to that of the interior portion of the Dutch oven cooking vessel, there is little chance for leaking and spillover from Dutch oven liner 40 into the interior portion of the Dutch oven cooking vessel.

FIG. 1 also illustrates Dutch oven liner having means for handling and carrying Dutch oven liner 40. FIG. 1 depicts opposing handles 62 integrally formed with upper portion 44 of side wall 46 as means for handling and carrying Dutch oven liner 40. Although not necessary to the invention herein, Dutch oven liner preferably comprises handles as they provide several convenient advantages. Handles 62 are shown as foldable or flexible handles that may be folded down out of the way during the actual cooking process. It is important to provide handles that do not extend above the surface of the outer wall of the Dutch oven cooking vessel, or that overlap onto the upper rim of the cooking vessel as cooking with a Dutch oven cooking vessel frequently requires the use of a lid in order to maintain a more even and constant temperature differential. Handles 62 may also comprise apertures 64 for allowing the user to grasp Dutch oven liner 40 when needed, and to facilitate the removal of Dutch oven liner 40 from the Dutch oven cooking vessel. The ability to remove Dutch oven liner 40 provides several significant advantages. First, it allows the user to prepare food without having to lug around a heavy vessel. Second, it allows the user to quickly and easily remove the liner during and after the cooking process for whatever reasons. Third, it provides a convenient serving dish instead of trying to serve out of the actual Dutch oven vessel. Fourth, is allows for safe removal of the liner while the Dutch oven is still hot. These are merely examples as other advantages may be recognized though not specifically recited herein. Dutch oven liner 40 may comprise various sorts of handles, such as a single handle spanning from one point on the perimeter to the other as shown on the Dutch oven cooking vessel in FIG. 3. In this instance, Dutch oven liner 40 would benefit from a rigid or semi-rigid ridge structure along upper portion 44 in order to support and maintain the shape of Dutch oven liner 40 when being carried and weighed down with food therein.

Figure 2:
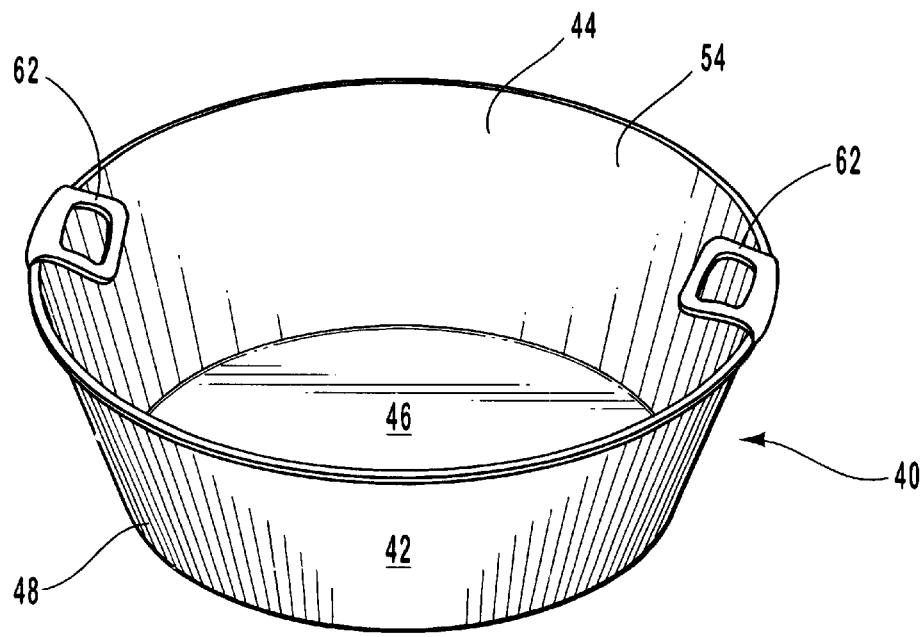
FIG. 2 illustrates a perspective view of the Dutch oven liner and associated handles in a tucked or folded position.

FIG. 2 illustrates handles 62 in their folded down and out of the way position within cooking interior 58.

Figure 3:
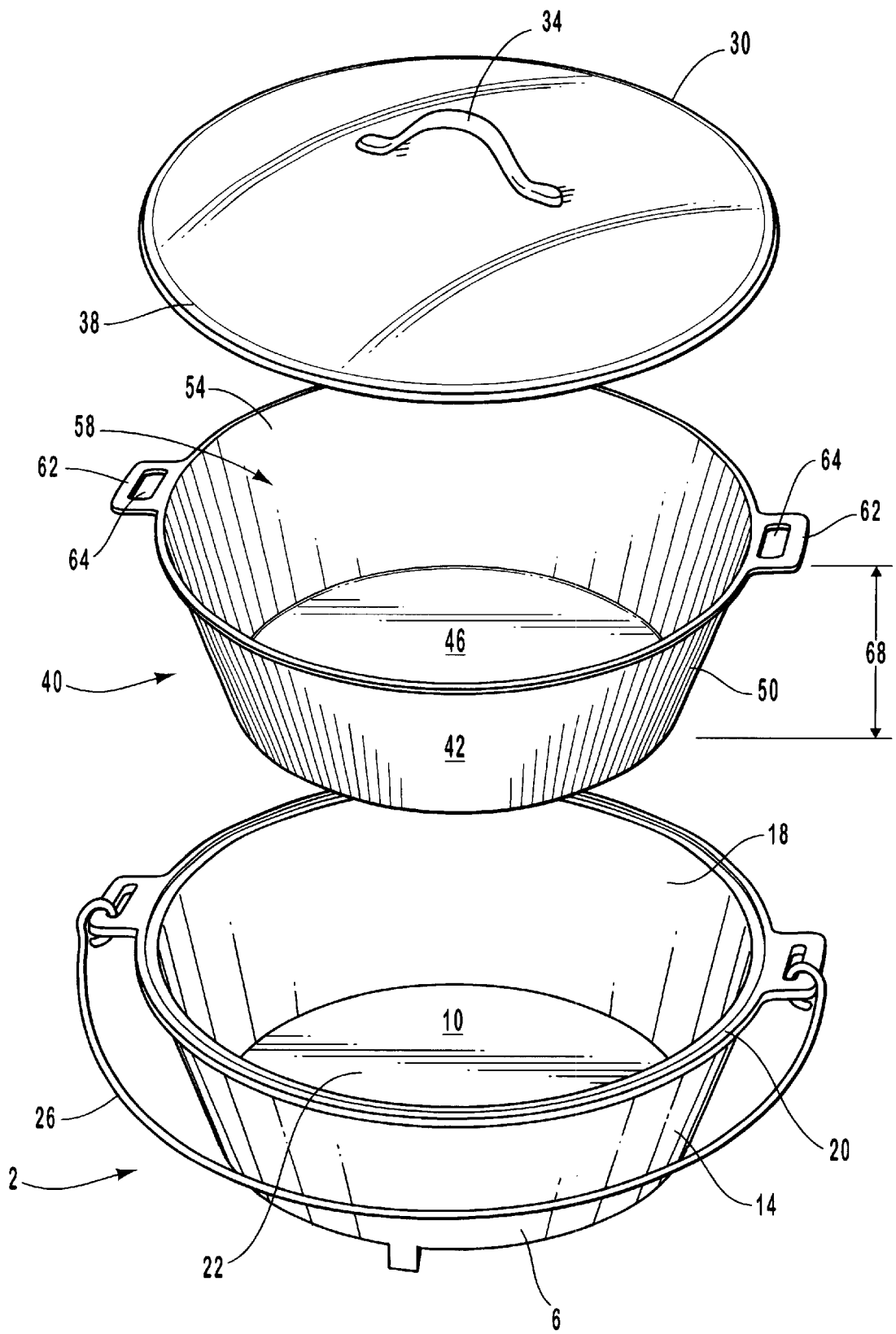
FIG. 3 illustrates the fittable relationship between the Dutch oven and the Dutch oven liner.

FIG. 3 illustrates Dutch oven liner 40 prior to its placement within an interior portion 22 of Dutch oven cooking vessel 2. FIG. 3 illustrates the proximate size and shape relationship existing between Dutch oven cooking vessel 2 and Dutch oven liner 40. In particular, Dutch oven liner is shown having a similar size and shape as interior portion 22 of Dutch oven cooking vessel 2. Dutch oven cooking vessel 2 is shown having a side wall 6 having an outside surface 14 and an inner surface 18 that forms a closed perimeter around and extends from a bottom 10 to form an interior 22 wherein food may be placed for cooking. Dutch oven cooking vessel 2 also includes shoulder 20, wherein a lid 30, having a handle 34 and a rim 38, may be placed and supported. Lid 30 is capable of fitting upon shoulder 20 of Dutch oven cooking vessel 2.

In order for Dutch oven liner 40 to function properly, it must fit in a close relationship with Dutch oven cooking vessel 2. This is for several reasons. First, it is important that Dutch oven liner be able to receive heat into its cooking interior 58 from Dutch oven cooking vessel 2. As such, Dutch oven liner 40, and particularly outer surface 50, should be juxtaposed in a matching and contacting or substantially contacting relationship with Dutch oven cooking vessel 2, and particularly inner surface 18. Moreover, the outside surface of bottom 46 of Dutch oven liner 40 should contact the inside surface of bottom 10 of Dutch oven cooking vessel 2. Such a relationship will allow heat to be transferred and received, either through conduction or convection, from Dutch oven cooking vessel 2 to Dutch oven liner 40. Second, providing a fitting relationship will prevent inadvertent leakage from Dutch oven liner 40 into Dutch oven cooking vessel 2.

Figure 4:
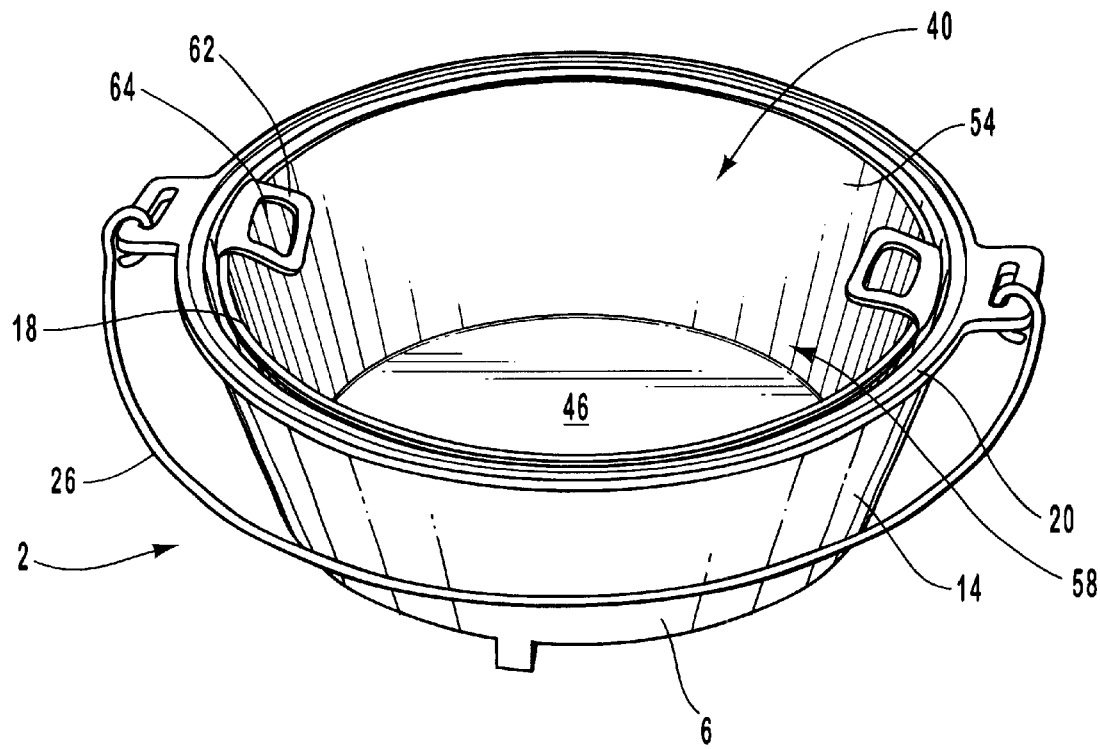
FIG. 4 depicts the Dutch oven liner as it is placed within the interior of the Dutch oven.

FIG. 4 illustrates the proper fitting relationship of Dutch oven liner 40 as it is placed within Dutch oven cooking vessel 2. Dutch oven liner 40, with or without handles, is placed directly into the Dutch oven either prior to or subsequent the addition of food. Indeed, the user may choose to prepare the food within the liner 40 prior to placing it within the cooking vessel 2, or the user may wish to perform all cooking steps with liner 40 properly in place within vessel 2.

Figure 5:
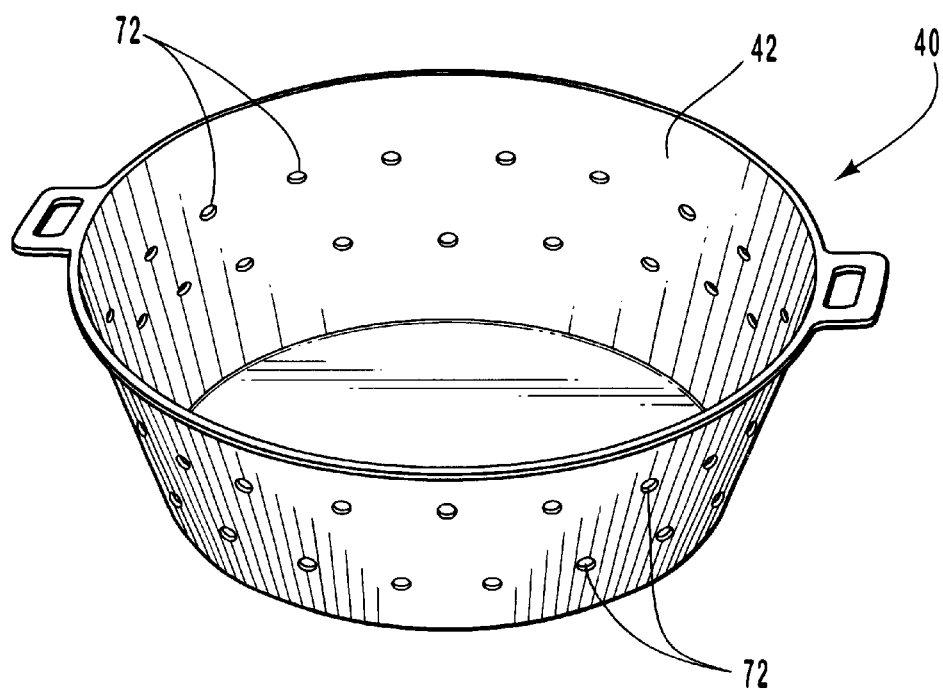
FIG. 5 illustrates an alternative embodiment of the Dutch oven liner having a plurality of apertures therein.

Finally, FIG. 5 illustrates an alternative embodiment of Dutch oven liner 40. In this design, Dutch oven liner 40, and particularly side wall 42, comprises a plurality of apertures 72 therein. Apertures 72 serve to provide a unique cooking environment not previously possible with a Dutch oven cooking vessel. For example, several uses may be possible, with one use being to provide the ability to place water in the bottom of the interior portion of the cooking vessel 2 for steaming food products within Dutch oven liner 40. Apertures 72 also allow heat to more easily enter cooking interior 58 of Dutch oven liner 40. Other advantages not described herein may be recognized by one ordinarily skilled in the art.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A Dutch oven liner comprising:
    a substantially upright side wall forming a closed perimeter, said upright side wall having an upper and lower portion, and an inner and outer surface,
    a bottom portion formed to said lower portion to create a cooking area capable of holding and allowing food to be cooked therein, wherein said Dutch oven liner is similar in dimension and shape to and capable of removably fitting within an interior portion of a Dutch oven cooking vessel, thereby simplifying the cooking and cleaning process associated with cooking with said Dutch oven cooking vessel as said Dutch oven liner prevents an interior of said Dutch oven cooking vessel from being exposed to a food product;
    wherein said wall and said bottom. are made of durable, yet deformable, aluminum; said Dutch oven liner having means for handling and carrying comprising at least one handle integrally and unitarily formed with said upper portion, said at least one handle being foldable between a position exterior of said closed perimeter and a position interior of said closed perimeter.

2. The Dutch oven liner as recited in claim 1, wherein said Dutch oven liner is capable of conducting and dissipating sufficient heat there through to cook said food.

3. The Dutch oven liner as recited in claim 1, wherein said Dutch oven liner is disposable.

4. The Dutch oven liner as recited in claim 1, wherein said Dutch oven liner is collapsible so as to be easily transportable.

5. The Dutch oven liner as recited in claim 1, wherein said upper portion comprises a ridge-like member surrounding said perimeter to provide additional support to said Dutch oven liner.

6. The Dutch oven liner as recited in claim 1, wherein said upright wall comprises a plurality of apertures therein.

7. A Dutch oven cooking system comprising:
    a Dutch oven cooking vessel having an interior therein;
    a lid fittable with said Dutch oven cooking vessel; and
    a Dutch oven liner similar in size and dimension to said Dutch oven cooking vessel, said. Dutch oven liner capable of removably fitting within said interior of said Dutch oven cooking vessel and allowing the replacement of said lid onto said Dutch oven cooking vessel to provide an improved cooking environment, wherein said Dutch oven liner simplifies and increases the efficiency of cooking with and cleaning said Dutch oven cooking vessel as food contained within said Dutch oven liner is sufficiently cooked due to a heat transferring relationship between said Dutch oven liner and said Dutch oven cooking vessel, and wherein said Dutch oven liner provides for quick and efficient cleaning of said Dutch oven liner by simply removing said Dutch oven liner,
    wherein said Dutch oven liner comprisings:
        a substantially upright side wall forming a closed perimeter, said upright side wall having an upper and lower portion, and an inner and outer surface;
        a bottom portion formed to said lower portion to create a cooking area capable of holding and allowing food to be cooked therein, wherein said Dutch oven liner is similar in dimension and shape to and capable of removably fitting within an interior portion of a Dutch oven cooking vessel, thereby simplifying the cooking and cleaning process associated with cooking with said Dutch oven cooking vessel as said Dutch oven liner prevents an interior of said Dutch oven cooking vessel from being exposed to a food product;
        wherein said wall and said bottom are made of durable, yet deformable, aluminum; said Dutch oven liner having means for handling and carrying comprising at least one handle integrally and unitarily formed with said upper portion, said at least one handle being foldable between a position exterior of said closed perimeter and a position interior of said closed perimeter.

* * * * *